United States Patent [19]

Coussot

[11] 4,364,702

[45] Dec. 21, 1982

[54] APPARATUS FOR STACKING OBJECTS OR GROUPS OF OBJECTS

[75] Inventor: Serge Coussot, Bersac, France

[73] Assignee: Etudes et Realisations Industrilles de Bersac (E.R.I.B.), France

[21] Appl. No.: 194,025

[22] Filed: Oct. 6, 1980

[30] Foreign Application Priority Data

Oct. 9, 1979 [FR] France ................................ 79 25069

[51] Int. Cl.³ .......................................... B65G 57/081
[52] U.S. Cl. ...................................... 414/31; 198/419; 414/52; 414/55; 414/762; 414/763; 414/900
[58] Field of Search .................... 414/31, 52, 55, 56, 414/69, 80, 761, 762, 763, 900; 198/403, 409, 419

[56] References Cited

U.S. PATENT DOCUMENTS 2,917,991 12/1959 Segur ............................... 198/403 X
2,967,630 1/1961 Parker .............................. 198/403 X
3,420,387 1/1969 Baum .............................. 414/900 X
3,596,779 8/1971 Osteen ............................. 414/55 X
3,777,913 12/1973 Schieser et al. ................. 198/403 X
3,970,202 7/1976 Speggiorin et al. ................... 414/31

Primary Examiner—Leslie J. Paperner
Attorney, Agent, or Firm—Murray & Whisenhunt

[57] ABSTRACT

Apparatus for the head-to-tail stacking of objects or groups of objects, such as folded cardboard packaging boxes, which are substantially identical in terms of their shapes, their dimensions and the orientation with which they are presented to the apparatus. The apparatus includes an aligning and retaining device which is mounted on a shaft extending above and transversely with respect to a conveyor. The aligning and retaining device is arranged to remove and invert a first batch of objects at the same time as abutments position a second batch below the first batch. The first batch are then laid on the second batch to form a stack.

6 Claims, 4 Drawing Figures

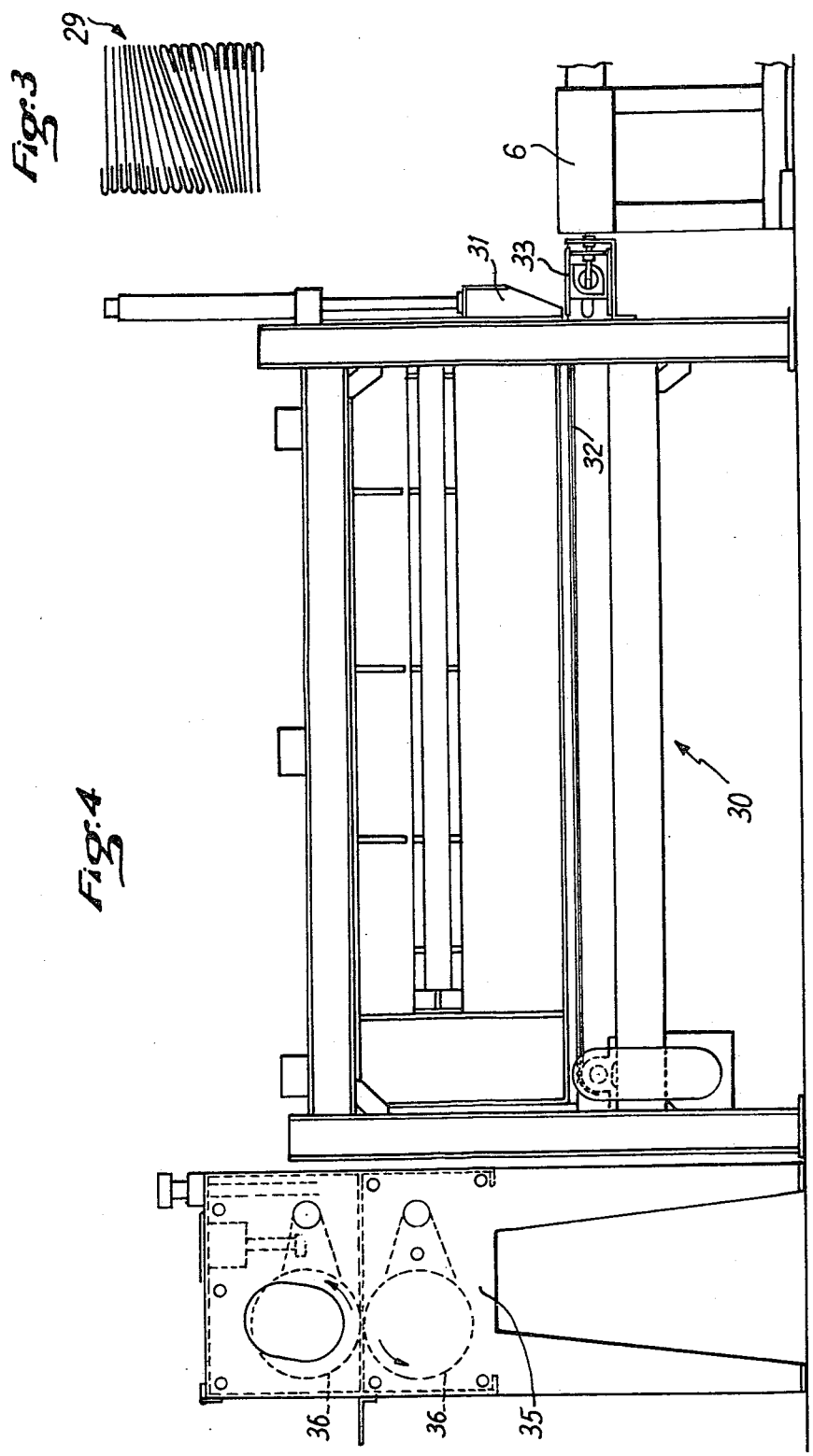

APPARATUS FOR STACKING OBJECTS OR GROUPS OF OBJECTS

BACKGROUND OF THE INVENTION

The present invention relates to apparatus for the head-to-tail stacking of articles which are substantially identical in shape and dimensions and which are successively presented to the apparatus with substantially identical orientation. Each article may be a single object or a batch of objects, such as a batch of folded cartons.

In the manufacture of packaging cartons a blank is cut, marked with fold lines and at least partially folded so that, when it is ready to be despatched to the factory which will fill it with a product to be packaged, the packaging unit is presented in the most compact form possible. The packaging units prepared in this way generally leave a folding machine or a folding/sizing machine one at a time. However, because of the partial folding, each packaging unit does not have a uniform thickness. In fact, one side is generally thicker than the other, for example the side which is to form a lid and has been folded over by the folding machine. It is for this reason that it is necessary to make provision for a manual operation to invert about half of the packaging units, so that the stacks for despatch, which have been made up head-to-tail, have the same thickness on both sides and thus form very uniform parallelepipeds having at least four mutually parallel edges perpendicular to the general plane of the blanks.

It is an object of the invention to propose a new apparatus which makes it possible to carry out, mechanically and reliably, the inversion of half of the folded packaging units and the formation of a stack for dispatch.

SUMMARY OF THE INVENTION

According to the invention there is provided apparatus for the head-to-tail stacking of articles where the articles are substantially identical in shape and dimensions, and where the articles are successively presented to the apparatus with substantially identical orientation, said apparatus comprising a conveyor having a reception zone and a delivery zone, and driven means for removing and inverting an article present in the reception zone and for presenting the inverted article to the delivery zone, wherein the space occupied by said driven means together with the inverted article is located above the space traversed by an article which is not removed by said driven means and is transferred by the conveyor from the reception zone to the delivery zone.

Preferably, the driven means comprises means for stopping and seizing an article, such as a batch of packaging units, in the reception zone.

The driven means is advantageously an aligning and seizing device which is rotatable through 180° about an axis transverse to the direction of transfer of the conveyor, and the axis of rotation of the aligning device is advantageously spaced above the conveyor. The apparatus may further comprise means for selecting the odd batches for removal and inversion, and means for selecting the even batches for direct transfer by the conveyor from the reception zone to the delivery zone.

Preferably, the apparatus comprises coordinated means for stopping each even batch in the delivery zone, for placing each odd batch, previously removed and inverted, on the even batch which has been stopped in the delivery zone, and for releasing the stack made up in this way, which is then carried along by the conveyor.

The means for stopping each even batch in the delivery zone is advantageously an abutment presented by the aligning device when the latter has been rotated through 180° and is above the delivery zone.

In an embodiment, the apparatus of the invention comprises at least one of the following two devices:

upstream, a device for piling up, and removing from a pile, identical objects, such as folded cardboard packaging boxes, in batches which are identically made up in respect of the number of the said objects and their orientation for presentation;

downstream, a device for receiving and tying or packing the stacks originating from the delivery zone.

BRIEF DESCRIPTION OF THE DRAWINGS

Embodiments of the present invention will hereinafter be described, by way of example, with reference to the accompanying drawings, in which:

FIG. 3 is a diagram illustrating the manner in which stacks are made up by the apparatus; and FIG. 4 is a simplified view of a supplying device combined with apparatus of the invention.

DESCRIPTION OF THE PREFERRED EMBODIMENTS

Figure 1:
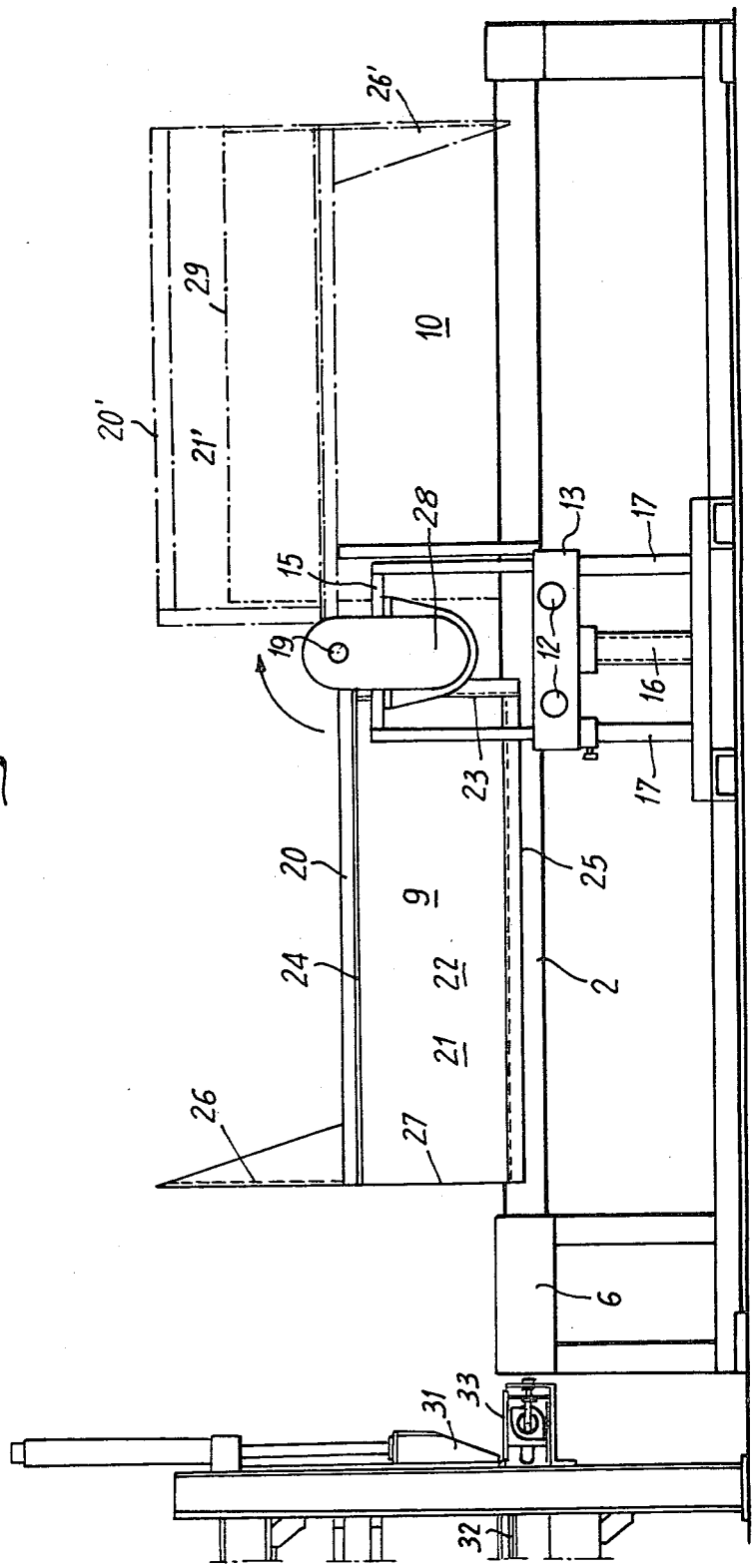
FIG. 1 is a side view of apparatus of the present invention.

Apparatus of the invention includes a fixed frame 1 carrying a conveyor 2 having a number of endless belts 3. Each belt 3 is driven by a respective drive pulley 4 and returned by a respective return pulley 7. The drive pulleys 4 are all fixedly mounted on a common drive shaft 5 for rotation therewith but the spacing between the pulleys 4 is adjustable. The drive shaft 5 is driven by a motor 6. The return pulleys 7 are similarly mounted on a common return shaft 8.

Figure 2:
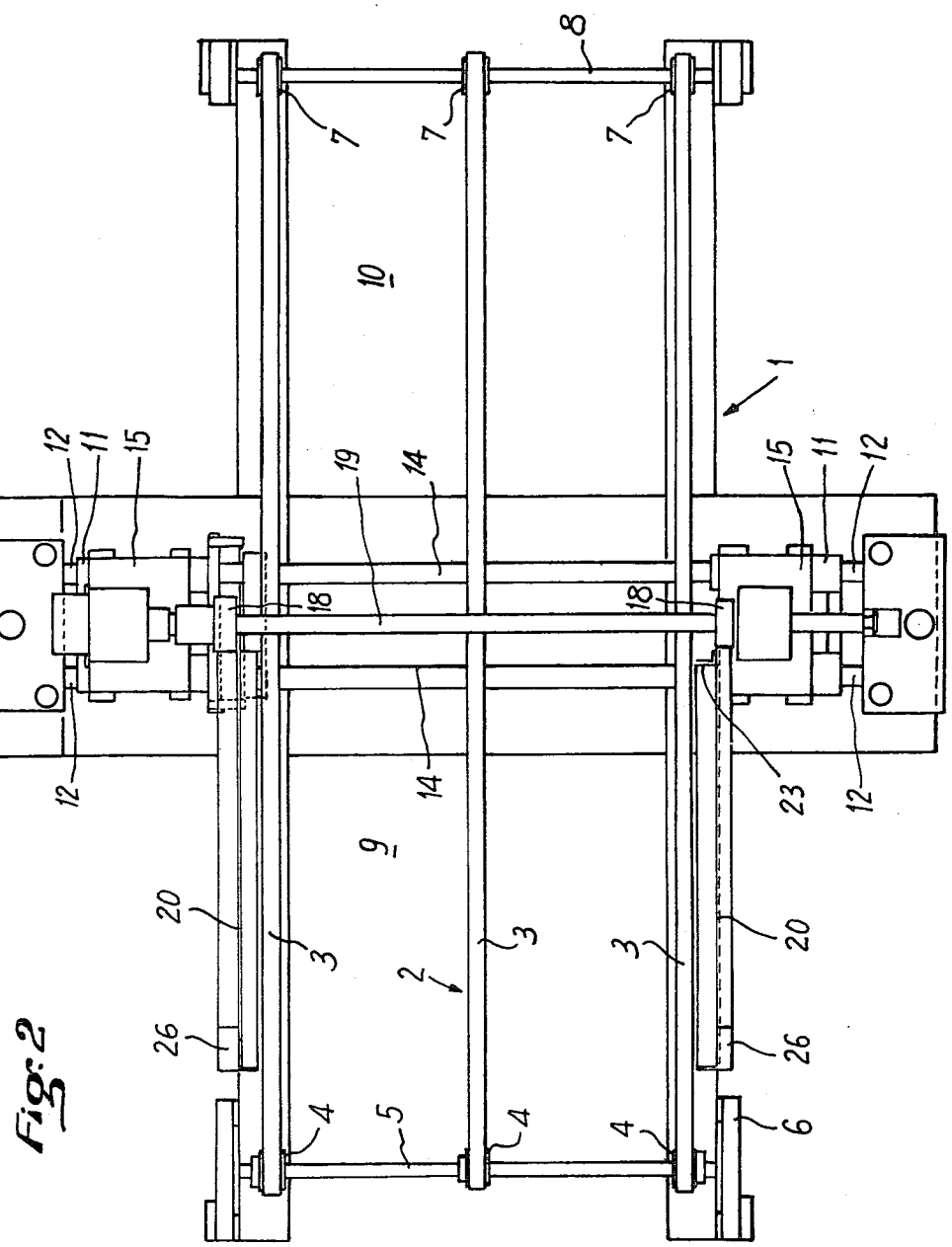
FIG. 2 is a plan view of the apparatus of FIG. 1.

In normal operation, the conveyor 2 moves in only one direction, namely from left to right as seen in FIGS. 1 and 2. It thus defines a reception zone 9, on the left-hand side in FIGS. 1 and 2, and a delivery zone 10, on the right-hand side in FIGS. 1 and 2.

Carriages 11 are mounted one on either side of the conveyor 2 and approximately centrally thereof. The carriages 11 are guided on guide supports 14 of which the horizontal separation can be mutually and symmetrically adjusted by means of jacks 12. A compression spring is mounted between one of the jacks 12 and its associated carriage 11. The guide supports 14 with the jacks 12 are mounted on two lifting plates 13 which can be adjusted to the same height by means of jacks 16 and columns 17. The carriages 11 each carry a support 15. These two supports 15 can thus be adjusted to the same height, with an adjustable mutual separation, so as to present two aligned bearings 18, 18' for a shaft 19 extending at a distance above the conveyor 2 and perpendicularly to the direction of displacement of the conveyor. The support 15 on one side of the conveyor 2 carries a motor 28 for rotating the shaft 19 through 180° in either direction. Two arms 20 are fixed to the shaft 19 for rotation therewith. Thus, the arms 20 can together rotate through 180°, to the right and to the left of the conveyor, between two opposing horizontal positions and parallel to the direction of displacement of the conveyor 2, that is to say above the reception zone 9 and above the delivery zone 10.

The arms 20 have channelled parts to match channels in the shaft 19 which extend between the limits of movement made possible by the stroke of the jacks 12. It is also because of the adjustable stroke of the jacks 12 that the bearing 18' must enable the shaft 19 to slide freely.

The arms 20 carry aligning devices 21 in the form of half-boxes possessing a vertical rectangular base 22 and three rims 23, 24, 25. These adjusting devices 21 are mounted symmetrically so that their vertical bases 22 project on each side of the conveyor 2. When the arms 20 extend over the reception zone 9, the vertical bases 22 extend from the arm 20 itself as far as a level approximately corresponding to that of the plane of the conveyor 2. The way in which the adjustable height of the arms above the conveyor, and the size of the bases 22 of the aligning devices are chosen will be described further hereinbelow.

It will be seen that when the arms 20 are positioned over the reception zone 9, the side 27 of each aligning device 21 which does not possess a rim faces the point of arrival of the conveyor 2, whilst the opposite side thereof, which is nearest to the pivot axis of the shaft 19, possesses a rim 23. Furthermore, the two rims 24, 25 are on the opposed edges of the aligning device which are then extending horizontally. Each aligning device 21 carries a short aligning abutment 26 which, when the aligning device is in position over the reception zone, is above the rimless side 27 thereof and is directed upwardly and towards the opposite aligning device. The abutment 26 has a height which is substantially equal to the height of the rimless side 27. When the arms 20 have been rotated through 180° to the position 20' over the delivery zone, it will be understood that the respective positions of the aligning devices 21 and of the aligning abutments 26 will have been inverted to become the respective positions 21' and 26', as shown in broken lines in FIG. 1.

The apparatus described above operates in the following manner. Consider the case of folded cardboard packaging boxes stacked in a skew manner, which are to be made up into batches having a thickness of about 400 mm, so that they are stacked head-to-tail, as shown in FIG. 3.

Firstly, the width of the conveyor is adjusted by suitably fixing the pulleys 7. Then, aligning devices 21 having a length which substantially corresponds to that of the cardboard boxes, observed along their direction of displacement, and having a height of about 200 mm, with a safety margin, are installed on the apparatus described above. The shaft 19 is lifted a corresponding distance above the plane of the conveyor 2. The aligning abutments 26 also have a height of 200 mm. The control of the jacks 12 is adjusted so that they can assume three possible positions, namely a reception position corresponding to the width of the cardboard boxes, with a safety margin, a squeezing position corresponding to the transverse squeezing of the cardboard boxes, and a release position corresponding to a separation, between opposite rims, which is greater than the width of the cardboard boxes.

The arms 20 are placed in a waiting position over the reception zone and the aligning devices 21 are adjusted in the reception position. A first batch of cardboard boxes having a height of 200 mm is then presented on the conveyor 2 and as the batch is stopped by the rim 23 it is fitted between the aligning devices 21. The batch of boxes is then squeezed by the aligning devices which are driven by the carriages 11 as the jacks 12 are controlled to take up their squeezing position. The cardboard boxes are squeezed by the aligning devices in an elastic manner, by virtue of the intercalated spring. The arms 20 are then rotated through 180° by means of the motor 28, which turns the batch and presents it above the delivery zone. As a result of this rotation the abutments 26 take up a position in the delivery zone. The abutments 26 define beneath the inverted aligning devices 21 a space of the same dimensions as the space which is defined between the aligning devices and which is currently occupied by the first batch of cardboard boxes. A second batch of cardboard boxes is then presented in the reception zone and, as can easily be understood, it is carried directly by the conveyor as far as the aligning abutments 26 exactly below the first inverted batch of boxes. At this moment, the conveyor is stopped and the jacks 12 are controlled to take up the release position, whereupon the first inverted batch is placed on the second unturned batch. Then the conveyor is restarted so as to deliver the 400 mm batch 29 of cardboard boxes, stacked approximately in alignment, to the following station, and the aligning devices are returned to their waiting position over the reception zone. Of course, the sequence described can be entirely automated by servo-control, for example, using abutment detectors between the aligning devices, in the inverted position of the rotating assembly, and abutment detectors on the aligning abutments of the inverted assembly.

Apparatus of the invention may also be used to form piles of four, six or more batches using a counting or height-detecting station. In all cases, the apparatus provides a means for automatically selecting the even and odd batches. It suffices to introduce one batch in two in the reception zone into the control of the aligning devices, it being possible for the other batch to be introduced during the rotation so long as this rotation is sufficiently rapid, for example by means of a jack. If the desired pile height is different from 400 mm, the dimensions of the aligning devices and of the aligning abutments will be adjusted accordingly and the height of the pivoting axis above the conveyor will also be adjusted.

The apparatus advantageously comprises upstream, a separating and counting device 35 (FIG. 4), comprising a pair of rollers 36 rotating in the same direction, so as to introduce only the upper (or lower) cardboard box of a supply in which the cardboard boxes arrive in a partially overlapping arrangement. The device 35 is followed by a storage unit 30 in which the cardboard boxes are stacked in batches as described above. The storage unit stacks the boxes in a horizontal succession to form a batch which is fed to an output hatch 31 by means of a conveyor belt 32. The discharging point 33 of the conveyor belt 32 arrives on the conveyor 2. The output hatch 31 is controlled so as to admit two spaced-apart batches when the adjusting devices 21 are in the waiting position over the reception zone. Downstream, any known aligning and packing or typing device will be suitable for receiving and packing or tying the stacks delivered by the conveyor 2.

I claim:

1. Device for stacking objects head to tail such as groups of several stacked cartons having one thickness at one end and a greater thickness at the opposite end, comprising a stationary frame which supports a conveyor having belts spaced in the crosswise direction extending between a receiving zone and a delivery zone, a turning device having two arms each supported by a means of movement in rotation and translation, each means being placed between the receiving zone and delivery zone on both sides of the conveyor, the arms extending in a vertical plane parallel to the belts, two opposite vertical walls being fastened respectively to the arms, a crosswise edge extending between the two vertical walls in the vicinity of the crosswise shaft, two bottom edges attached respectively to the vertical side walls being at the level of the belts, when the turning device is placed at the receiving zone for loading this device with cartons, the arms being able to turn 180° to put the turning device above the delivery zone, the bottom edges then being spaced fron this zone in the vertical direction and the cartons contained in the device being held above this zone by the effect of the side walls thrust toward one another by jacks.

2. Device according to claim 1, wherein the means supporting the arms comprises a crosswise shaft spaced vertically from the belts and coupled to a pivoting motor, each arm being keyed to rotate and free in translation of this crosswise shaft and being connected to a jack acting in the lengthwise direction of the shaft.

3. Device according to claim 2, wherein the crosswise shaft is maintained in bearings which are each supported by a lifting plate that can be vertically adjusted in position, each plate also supporting the jack for moving of an arm.

4. Device according to one of claims 2 or 3, wherein a compression spring is placed between a jack and the arm associated with this jack.

5. Device according to claim 1, wherein a stop is placed to support the free end of each arm when they extend beyond the delivery zone.

6. Device according to claim 5, wherein each stop is fastened to the free end of the arms to come to rest on the stationary frame of the conveyor when the turning device is extended above the delivery zone.

* * * * *